J. R. Henshaw,
Snap Hook,
Nº 21,879. Patented Oct. 26, 1858.
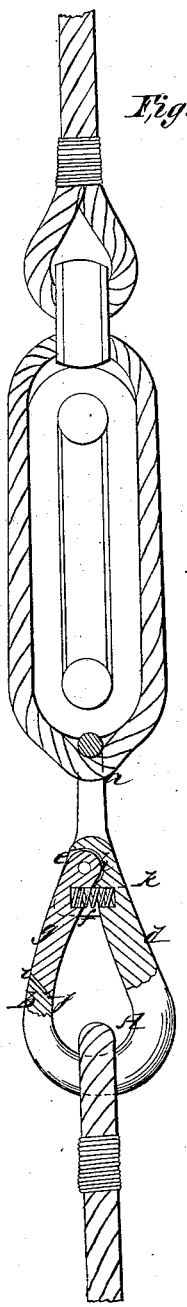
Fig: 1
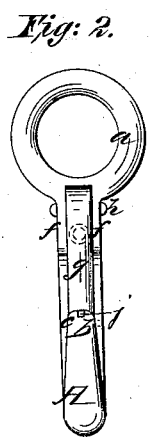
Fig: 2

UNITED STATES PATENT OFFICE.

J. R. HENSHAW, OF MIDDLETOWN, CONNECTICUT.

SELF-MOUSING HOOK.

Specification forming part of Letters Patent No. 21,879, dated October 26, 1858; Reissued February 6, 1866, No. 2,166; again Reissued February 11, 1868, No. 2,867.

*To all whom it may concern:*

Be it known that I, J. R. HENSHAW, of Middletown, in the county of Middlesex and State of Connecticut, have invented a new and useful Improvement in Hooks Designed More Particularly for Maritime or Naval Use, and which I term a "Self-Mousing Hook;" and I do hereby declare that the following is a full, clear, and exact description of the same, reference being had to the annexed drawings, making a part of this specification, in which—

Figure 1, is a side sectional view of my invention. Fig. 2, is an edge view of ditto.

Similar letters of reference indicate corresponding parts in the two figures.

To enable those skilled in the art to fully understand and construct my invention I will proceed to describe it.

A, represents a hook constructed of metal and having an eye $a$, formed at one end as usual. The front or end $b$, of the hook is made oblique forming an angle of about 45° with the sides thereof and a groove $c$, is made centrally in and across the face of the end $b$. At the end of the shank $d$, of the hook adjoining the eye $a$, a socket $e$, is formed by having an ear $f$, made at each side of the shank $d$, and within the socket $e$, one end of a bar $g$, is pivoted as shown at $h$. The opposite end of the bar $g$, is beveled as shown at $i$, and corresponding inversely with the end $b$ of the hook A, as shown clearly in Fig. 1, the end $i$, having a ledge or projection $j$, formed on it which ledge fits in the groove $c$, of the end $b$, of the hook. Within the socket $e$, a spiral spring $k$, is fitted. This spring is constructed of brass, at least that would be the most preferable material, and one end of the spring bears against the bar $g$, and the other end bears against the shank $d$, of the hook A. The spring $k$, has a tendency to keep the end $i$, of the bar $g$, against the end $b$, of the hook A, and as said ends are beveled the bar cannot be forced outward beyond the end $b$. The ledge or projection $j$, fitting in the groove $c$, prevents any lateral play of bar $g$.

From the above description it will be seen that the hook may be readily passed through a thimble or any loop for the bar $g$, will readily spring inward and when the hook has been passed through the thimble the bar $g$, will be immediately thrown back by the spring $k$, so that the thimble or loop cannot be casually detached or removed from the hook. The bar $j$, therefore is a substitute for the spun-yarn that is frequently attached to the point and shank of the hook to prevent the hook being casually detached or removed from the article placed, said yarn thus attached being technically termed a "mousing." This attachment of the spun yarn to the hook occupies considerable time and is rather inconvenient to remove the hook or detach it from articles with which it is connected. By my improvement this difficulty is obviated, as the bar $g$, is self-acting.

It is essential that the bar $k$, be fully inclosed within the socket $e$, in order that it may be protected from injury. Thimbles placed on the hook often have a great deal of play and moved forward and backward thereon in a violent manner, sufficiently so to render inoperative any exposed spring, but in my invention the lips $f$, $f$, will receive all concussions of this character and fully protect the spring $k$.

I am aware that catches and devices similar to the hook herein described have been used in the way of jewelry, for chain catches and watch hooks, but so far as I am aware such devices in which springs are employed have had the springs exposed and would not answer the purpose designed for the invention herein described. I do not claim therefore the employment or use of a snap or spring bar attached to a hook irrespective of the arrangement of the spring for the purpose of protecting it.

I claim therefore as new and desire to secure by Letters Patent,

As an improved article of manufacture, a self-mousing hook, having a socket $(e)$ and ear $(f)$ and a horizontal spring $(k)$; the whole made as herein shown and described.

J. R. HENSHAW.

Witnesses:
MARIA W. BARNES,
JONATHAN BARNES.